United States Patent

[11] 3,623,685

| [72] | Inventor | Newell E. Thomson |
| | | Gorham Bridge Road, Florence, Vt. 05744 |
| [21] | Appl. No. | 842,974 |
| [22] | Filed | July 18, 1969 |
| [45] | Patented | Nov. 30, 1971 |

[54] HANDLINE OR FISHPOLE HOLDER
1 Claim, 6 Drawing Figs.

[52] U.S. Cl. ........................................... 248/38, 248/156
[51] Int. Cl. .............................................. A01k 97/10
[50] Field of Search .............................. 248/39, 40, 41, 42, 44; 43/17, 21.2, 27.4; 52/103, 155, 159, 165

[56] References Cited
UNITED STATES PATENTS

| 461,586 | 10/1891 | Matzenauer | 43/17 |
| 1,865,989 | 7/1932 | Wilber et al. | 248/87 |
| 2,900,153 | 8/1959 | Lazur | 248/44 |
| 3,076,557 | 2/1963 | Husted et al. | 248/156 X |

FOREIGN PATENTS

| 603,073 | 6/1948 | Great Britain | 248/38 |

Primary Examiner—William H. Schultz

ABSTRACT: A device for supporting a fishing pole or hand line in an elevated position, the device comprising a tubular stake into which there is inserted a flexible rod that protrudes upwardly therefrom, the upper ends of the rod and stake each having a saddle across which a handline or fishing pole may be rested, the lower ends thereof being inserted into the ground.

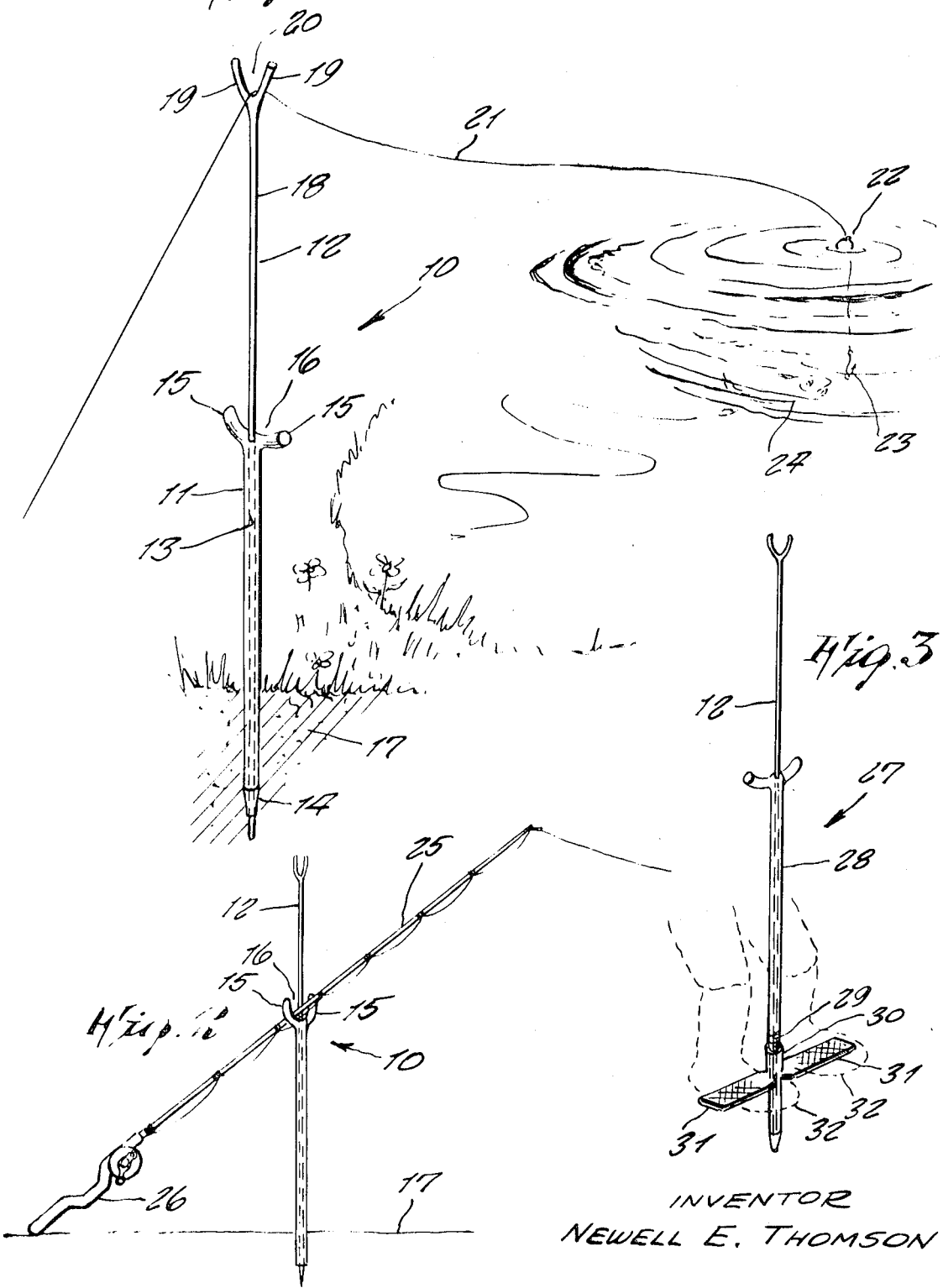

PATENTED NOV 30 1971 3,623,685
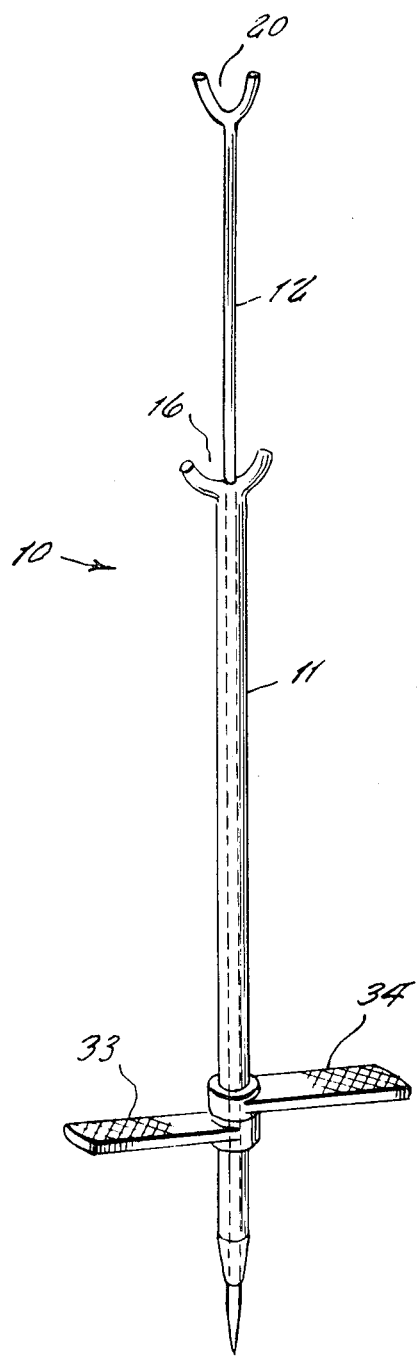
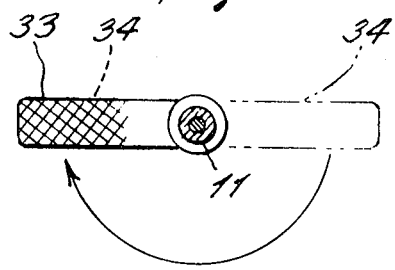
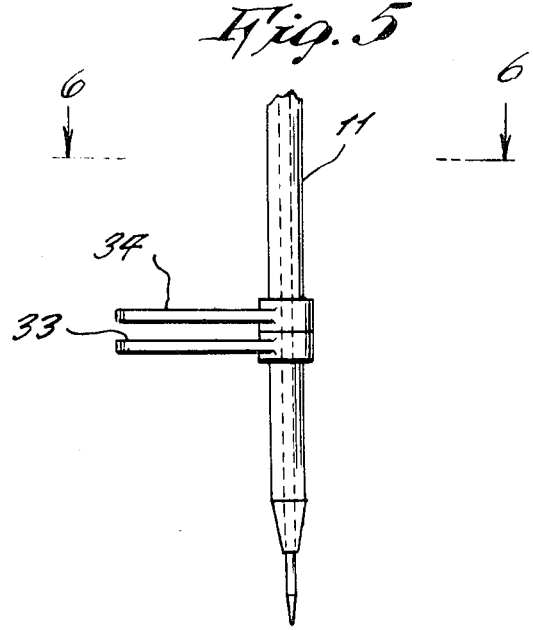
INVENTOR
NEWELL E. THOMSON

HANDLINE OR FISHPOLE HOLDER

This invention relates generally to fishing gear.

A principle object of the present invention is to provide a holder against which a fisherman may place his fishing pole while fishing and which accordingly does not require that the same be held in the fisherman's hand, or where across a handline may be placed so as to place the handline relatively high above the ground so that a fisherman may observe whether there is a pull on the line by a fish caught on a hook.

Yet a further object of the present invention is to provide a handline and fishpole holder wherein there is an upwardly extending flexible rod, the upper end of which will flex upon the action of movement of the handline due to a fish being caught upon the hook, thus readily indicating to the fisherman that he has caught a fish.

Yet a further object is to provide a handline and fishpole holder which incorporates a tubular stake within which the flexible rod is vertically supported, the lower end of the tubular stake being insertable into the ground, and the stake having a pair of sidewardly extending steps upon which the fisherman may place his feet for easy insertion of the stake into the ground.

Other objects of the present invention are to provide a handline and fishpole holder which is simple in design, inexpensive to manufacture, rugged in construction easy to use and efficient in operation.

These and other objects will be readily evident upon a study of the following specification and the like accompanying drawing wherein:

FIG. 1 is a perspective view of one form of the present invention,

FIG. 2 is a side elevation view thereof shown in an alternate use, and

FIG. 3 is a modified form of the present invention shown incorporating sidewardly extending steps for aiding insertion of the lower end of the stake into the ground FIG. 4 is a perspective view of the present invention showing a modified steps construction; and FIG. 5 is a side elevation view thereof shown fragmentarily and illustrating the steps in an alternate position.

FIG. 6 is a cross-sectional view on line 6—6 of FIG. 5.

Referring now to the drawing in detail, and more particularly to FIGS. 1 and 2 of the drawing, the reference numeral 10 represents a handline and fishpole holder according to the present invention there is a tubular stake 11 and an elongated flexible rod 12.

The stake 11 comprises a longitudinally extending member having a central opening 13 extending therethrough, the lower end of the stake being relatively pointed, as shown at 14, and the upper end of the stake having a pair of oppositely extending handles 15 which are upwardly arched so as to form a saddle 16 therebetween. The purpose of the handles 15 are so to allow application of pressure upon the upper end of the stake so as to insert the lower end of the stake into the ground 17.

The flexible rod 12 includes a relatively long, straight shank 18 which at its upper end is bifurcated with extensions 19 between which is formed a saddle 20.

In operative use, the stake 11 is inserted into the ground, as shown in FIG. 1 of the drawing, after which the rod 12 is inserted downwardly into the opening 13, the upper end of the rod 12 thus extending high above the stake and the saddle 20 receiving a handline 21 which at one end is connected to a float 22 that supports a downwardly extending fishhook 23 within the water. The opposite end of the handline may be tethered to any convenient place desired by the fisherman.

In case a fish 24 bites upon the hook 23, the handline will be observed to be pulled. Such pulling may be more readily discerned if the fisherman wraps the handline a few times around the extension 19 of the rod 12 so that the flexible rod will flex visibly and thus call attention of the fisherman.

In a modified use of the present device, 10, a fishing pole 25 may be rested across the saddle 16 of the stake 11, as shown in FIG. 2, while the handle end of the fishing pole is rested against the ground 26. In this form of use of the invention, the fisherman thus is free from holding the fishing pole in his hands and needs only to observe any flexing of the tip end of the fishing pole in case a fishing line is tugged by a fish caught on the hook.

In FIG. 3 of the drawing, a modified holder 27 is shown which is comprised of a tubular stake 28 into which a rod 12 is inserted, as above described. In the present form of the invention, the tubular stake 28 is provided with a screw threaded portion 29 upon which there is secured a sleeve 30 having a pair of sidewardly opposite extending steps 31 and upon which a fisherman may place his feet 32 while inserting the stake into the ground, thus using the fisherman's own weight for forcing the stake downward.

Referring now to FIGS. 4 and 5, the handline or fishpole holder 10 is shown to include a modified step construction comprised of a pair of individual steps 33 and 34 which are of a design so that they may be individually rotatable about the stake 11 for selective position one over the other as shown in FIG. 5 so to be vertically spaced apart relative to each other, or wherein the steps may alternately be positioned upon opposite sides of the stake such as shown in FIG. 4.

Thus there has been provided an improved handline and fishpole holder which will make it more convenient and relaxing for a fisherman without need of holding the line or fishing pole in his hand. Thus a fisherman needs only to observe the upper end of the flexible rod or the tip of the fishing pole so as to see if the same is flexing, thus being notified that a fish is caught upon the hook.

What I now claim is:

1. In a handline or fishpole holder, the combination of a longitudinally extending tubular stake, and an elongated rod, said rod being made of flexible material, and said rod and said stake each having self-contained means for supporting either a handline or fishpole thereacross, said stake comprising a straight member having a central opening extending longitudinally therethrough, a lower end of said stake being convergingly tapered so as to allow easy introduction thereof into the ground, and the opposite end of said stake being provided with a pair of sidewardly, oppositely extending handles, each of said handles being upwardly arched so as to form a saddle therebetween, said rod comprising a straight elongated member of relatively longer dimension than said stake, said rod comprising a shank which at its upward end is bifurcated by means of upwardly extending extensions between which there is a saddle, said stake incorporating a pair of sidewardly oppositely extending steps, said steps being adaptable for placement of a fisherman's feet thereupon so to aid in the insertion of said lower end of said stake into the ground, said steps being individually rotatable about said stake for selective position one over the other and in vertically spaced apart relation to each other.

* * * * *